United States Patent
Mednik et al.

(10) Patent No.: US 8,358,090 B1
(45) Date of Patent: Jan. 22, 2013

(54) DIMMER CIRCUIT FOR TRANSFORMER—ISOLATED LED DRIVER AND METHOD THEREFOR

(75) Inventors: Alexander Mednik, Campbell, CA (US); Rohit Tirumala, Sunnyvale, CA (US)

(73) Assignee: Supertex, Inc., Sunnyvale, CA (US)

( * ) Notice: Subject to any disclaimer, the term of this patent is extended or adjusted under 35 U.S.C. 154(b) by 500 days.

(21) Appl. No.: 12/724,339

(22) Filed: Mar. 15, 2010

(51) Int. Cl.
*H05B 37/02* (2006.01)

(52) U.S. Cl. ........ 315/360; 315/291; 315/224; 315/225; 315/DIG. 4

(58) Field of Classification Search ............ 315/51, 315/178, 209 R, 210, 224, 225, 226, 246, 315/247, 250, 291, 307, 308, 312, 360, DIG. 4
See application file for complete search history.

(56) References Cited

U.S. PATENT DOCUMENTS

| | | | | |
|---|---|---|---|---|
| 8,008,866 B2 * | 8/2011 | Newman et al. | ............... | 315/224 |
| 2005/0264472 A1 * | 12/2005 | Rast | ................. | 345/30 |
| 2008/0018261 A1 * | 1/2008 | Kastner | ........................ | 315/192 |
| 2010/0320936 A1 * | 12/2010 | Yao | ................. | 315/297 |

\* cited by examiner

*Primary Examiner* — Haiss Philogene
(74) *Attorney, Agent, or Firm* — Weiss & Moy, P.C.; Jeffrey D. Moy

(57) ABSTRACT

A driver circuit has a Light Emitting Diode (LED) driver having an input and output. A switching device is coupled to an output of the LED driver. An edge detector is coupled to the LED driver. A timing device is coupled to the edge detector. A latch is coupled to the edge detector, the timing device and the switching device.

22 Claims, 1 Drawing Sheet

DIMMER CIRCUIT FOR TRANSFORMER—ISOLATED LED DRIVER AND METHOD THEREFOR

RELATED APPLICATIONS

This application claims the benefit of U.S. Provisional Application No. 61/161,889 filed Mar. 20, 2009, which is incorporated herein by reference in their entirety.

FIELD OF THE INVENTION

The invention relates to a Light Emitting Diode (LED) driver and, more specifically, to a circuit for driving the PWM dimming switch on the secondary of the LED driver without use of an optical isolator.

BACKGROUND OF THE INVENTION

Compatibility of switch-mode LED drivers with conventional TRIAC-based leading-edge AC dimmer circuits has been a continuous challenge in solid-state lighting. Prior art came out with various ways to control the LED current magnitude in proportion with the output voltage or the conduction angle of an AC dimmer. However, it is typically desired in lighting to preserve the color correlated temperature (CCT), or the "white point" stability. Varying the LED current causes a shift in its chromaticity.

Alternatively, pulse-width modulation of the LED current can be used, while preserving the current magnitude, or so-called PWM dimming method. It is relatively easy to generate the necessary PWM control signal from the output waveform of the AC dimmer. Nevertheless, while improving the COT characteristic, this dimming method complicates the circuit implementation. Most switch-mode power supplies include a significantly large output filter capacitor. Hence, the LED load needs to be disconnected from the driver output using a load switch to obtain reasonable rising and falling times of the LED current. Moreover, the PWM control signal needs to be communicated across the primary-to-secondary isolation barrier of a power transformer by using an optically isolated load switch gate driver circuit. Yet another problem arises from the finite response time of the constant-current feedback of the LED driver limiting the rise time of the LED current and potentially causing it to over-shoot.

Therefore, a need existed to provide a system and method to overcome the above problems.

SUMMARY OF THE INVENTION

In accordance with one embodiment, a driver circuit has a Light Emitting Diode (LED) driver having an input and output. A switching device is coupled to an output of the LED driver. An edge detector is coupled to the LED driver. A timing device is coupled to the edge detector. A latch is coupled to the edge detector, the timing device and the switching device.

In accordance with another embodiment, a driver circuit has a Light Emitting Diode (LED) driver having an input and output, the LED driver used to drive an array of LEDs coupled to the output of the LED driver when the input of the LED driver is coupled to an Alternating Current (AC) voltage source. A switching device is coupled to an output of the LED driver for connecting the AC voltage source to the LED driver. An edge detector is coupled to the LED driver. A timing device is coupled to the edge detector. A latch is coupled to the edge detector, the timing device and the switching device.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

The present invention provides a circuit for driving the PWM dimming switch on the secondary of the LED driver without use of an optical isolator. The circuit of the present invention derives the PWM control signal from the switching waveform at the power transformer secondary winding.

Figure 1:
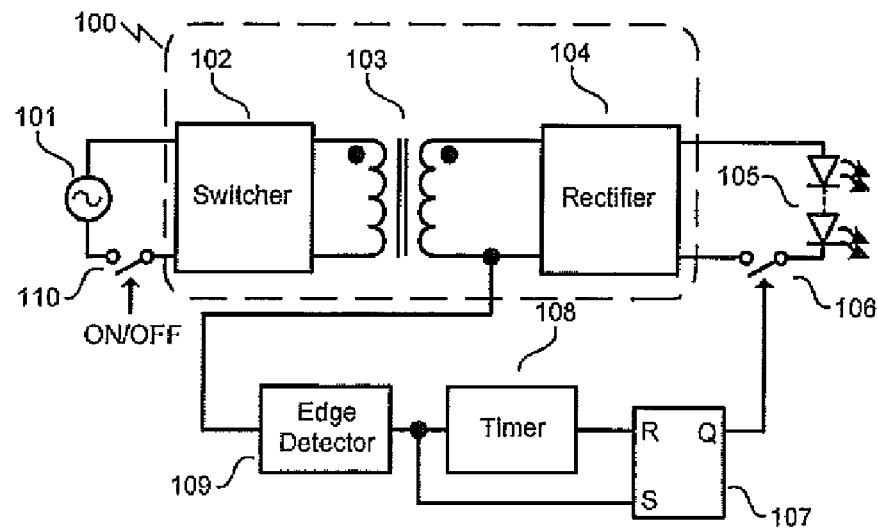
FIG. 1 is a simplified block diagram of a circuit for driving the PWM dimming switch on the secondary of the LED driver in accordance with one embodiment of the present invention.

Referring to FIG. 1, one embodiment of a circuit for driving the PWM dimming switch on the secondary of the LED driver is shown. The circuit includes an LED driver circuit 100. The circuit 100 receives power from the AC mains voltage 101 through a dimmer switch 110. The circuit 100 delivers constant current to an LED load 105 through a load switch 106.

In the present embodiment, the LED driver circuit 100 has a power transformer 103. The power transformer 103 has a primary winding and a secondary winding and provides galvanic isolation between the windings. A primary switch 102 is coupled to the primary winding of the power transformer 103. A rectifier 104 is coupled to the secondary winding of the power transformer 103.

The circuit of FIG. 1 further includes an edge detector 109 having an input 109A and an output 109B. The input 109A of the edge detector 109 is coupled to the secondary winding of the power transformer 103. A timer 108 has an input 108A coupled to the output 109B of the edge detector 109. An output 108B of the timer 108 is coupled to a reset terminal R of a latch 107. A set terminal 107B of the latch 107 is coupled to the output 109 of the edge detector 109. An output 107C of the latch 107 is coupled to the load switch 106.

Following the turn-on of the dimmer switch 110, the edge detector 109 detects a switching edge at the secondary winding of the power transformer 103 and starts the timer 108. At the same time, the latch 107 is set to the high output state, turning the load switch 106 on and enabling current to flow in the LED load 105. Each following switching edge of the transformer 103 re-starts the timer 108, and the latch 105 remains in the output high state. The timer 105 is programmed to introduce a delay longer than one switching cycle of the switch 102. When the AC mains voltage 101 becomes low, no switching edge is detected by the edge detector 109. The timer 108 resets the latch 107 to its output low state, and the load switch 106 turns off. Normally, the dimmer switch 110 is TRIAC based, and it turns off inherently when there is no current flow from the AC mains voltage source 101.

Figure 2:
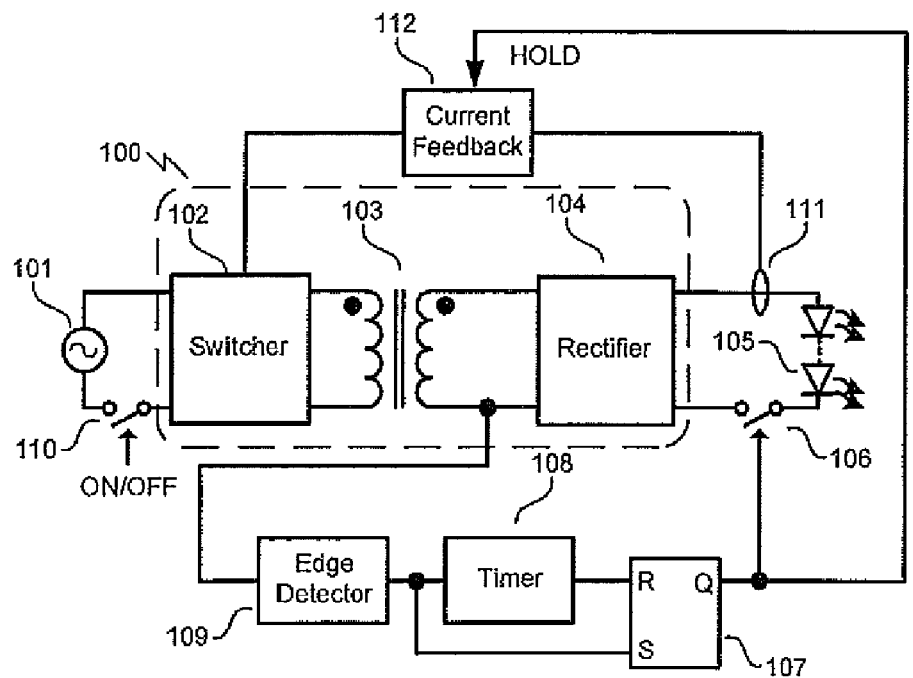
FIG. 2 is a simplified block diagram of a circuit for driving the PWM dimming switch on the secondary of the LED driver in accordance with another embodiment of the present invention.

Referring now to FIG. 2, another embodiment of the present invention is depicted. The circuit in FIG. 2 is similar to that of FIG. 1. However, the circuit in FIG. 2 further includes a current sensor 111 and a constant-current feedback 112. The feedback 112 detects current in the LED load 105 through the sensor 111 and maintains this current at a programmed substantially DC level by controlling the primary switch 102 accordingly, while the switch 106 is on. When the switch 106 turns off, the feedback 112 holds its steady-state operating point such that the current in the LED load 105 recovers almost immediately, when the switch 106 is enabled again.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A driver circuit comprising:
   a Light Emitting Diode (LED) driver having an input and output;
   a switching device coupled to an output of the LED driver;
   an edge detector coupled to the LED driver;
   a timing device coupled to the edge detector; and
   a latch coupled to the edge detector, the timing device and the switching device.

2. A driver circuit in accordance with claim 1 further comprising:
   a current sense element coupled to the output of the LED drive; and
   a current feedback circuit coupled to the current sense element and the latch.

3. A driver circuit in accordance with claim 1 wherein the LED driver comprises:
   a power transformer having a primary winding and a secondary winding;
   a primary switch coupled to the primary winding of the transformer;
   a rectifier coupled to the secondary winding of the transformer.

4. A driver circuit in accordance with claim 3 wherein the transformer provides galvanic isolation between the primary winding and secondary winding.

5. A driver circuit in accordance with claim 1 wherein the timing device is programmed to delay a reset of the latch for at least one switching cycle of the LED driver.

6. A driver circuit in accordance with claim 1 wherein the edge detector detects a switching edge at a secondary winding of a transformer and activates the timing device and sets the latch to a high output state, activating the switching device on and enabling current to flow to the array of LEDs.

7. A driver circuit comprising:
   a Light Emitting Diode (LED) driver having an input and output, the LED driver used to drive an array of LEDs coupled to the output of the LED driver when the input of the LED driver is coupled to an Alternating Current (AC) voltage source;
   a switching device coupled to an output of the LED driver for connecting the AC voltage source to the LED driver;
   an edge detector coupled to the LED driver;
   a timing device coupled to the edge detector; and
   a latch coupled to the edge detector, the timing device and the switching device.

8. A driver circuit in accordance with claim 7 wherein the LED driver comprises:
   a power transformer having a primary winding and a secondary winding;
   a primary switch coupled to the primary winding of the transformer;
   a rectifier coupled to the secondary winding of the transformer.

9. A driver circuit in accordance with claim 8 wherein the edge detector detects a switching edge at the secondary winding of the transformer and activates the timing device and sets the latch to a high output state, activating the switching device on and enabling current to flow to the array of LEDs.

10. A driver circuit in accordance with claim 7 wherein the timing device is programmed to delay a reset of the latch for at least one switching cycle of the LED driver.

11. A driver circuit in accordance with claim 7 wherein the AC voltage source is an output of a phase controlled dimmer switch.

12. A driver circuit in accordance with claim 6 wherein the transformer provides galvanic isolation between the primary winding and secondary winding.

13. A driver circuit in accordance with claim 8 wherein the current feedback circuit detects current in the array of LEDs through the current sense element and maintains this current at a programmed substantially DC level by controlling the primary switch of the transformer of the LED driver when switching device is activated.

14. A driver circuit in accordance with claim 13 wherein when the switching device is deactivated, the feedback circuit holds a steady-state operating point such that the current in the array of LEDs recovers almost immediately, when the switch device is activated again.

15. A driver circuit in accordance with claim 7 further comprising:
   a current sense element coupled to the output of the LED drive; and
   a current feedback circuit coupled to the current sense element and the latch.

16. A driver circuit in accordance with claim 7 wherein the edge detector detects a switching edge at a secondary winding of a transformer and activates the timing device and sets the latch to a high output state, activating the switching device on and enabling current to flow to the array of LEDs.

17. A driver circuit comprising:
   a Light Emitting Diode (LED) driver having an input and output, the LED driver used to drive an array of LEDs coupled to the output of the LED driver when the input of the LED driver is coupled to an Alternating Current (AC) voltage source, the LED driver comprising:
      a power transformer having a primary winding and a secondary winding;
      a primary switch coupled to the primary winding of the transformer; and
      a rectifier coupled to the secondary winding of the transformer;
   a switching device coupled to an output of the LED driver for connecting the AC voltage source to the LED driver;
   an edge detector coupled to the LED driver;
   a timing device coupled to the edge detector; and
   a latch coupled to the edge detector, the timing device and the switching device;
   wherein the edge detector detects a switching edge at the secondary winding of the transformer and activates the timing device and sets the latch to a high output state, activating the switching device on and enabling current to flow to the array of LEDs;
   wherein the timing device is programmed to delay a reset of the latch for at least one switching cycle of the switching device.

18. A driver circuit in accordance with claim 17 wherein the transformer provides galvanic isolation between the primary winding and secondary winding.

19. A driver circuit in accordance with claim 17 wherein the current feedback circuit detects current in the array of LEDs through the current sense element and maintains this current at a programmed substantially DC level by controlling a primary switch of a transformer of the LED driver when switching device is activated.

20. A driver circuit in accordance with claim 19 wherein when the switching device is deactivated, the feedback circuit holds a steady-state operating point such that the current in the array of LEDs recovers almost immediately, when the switch device is activated again.

21. A driver circuit in accordance with claim 17 further comprising:
   a current sense element coupled to the output of the LED drive; and
   a current feedback circuit coupled to the current sense element and the latch.

22. A driver circuit in accordance with claim 17 wherein the AC voltage source is an output of a phase controlled dimmer switch.

* * * * *